United States Patent Office 3,562,381
Patented Feb. 9, 1971

3,562,381
PROCESS FOR PRODUCING ARTICLES OF
POLYVINYL ALCOHOL
Ichiro Sakurada, Masakatsu Taniguchi, Kyoto, Akira
Utsuo and Yasumasa Chonan, Tokyo, and Ayako
Totani, Takatsuki-shi, Japan, assignors to Nihon
Hikaku Kabushiki Kaisha, Tokyo, Japan, a Japanese
corporation
No Drawing. Filed Oct. 8, 1968, Ser. No. 765,998
Int. Cl. D01f 7/00
U.S. Cl. 264—185                              4 Claims

ABSTRACT OF THE DISCLOSURE

A method of manufacturing articles such as fibers in which collagen, gelatin or glue are blended with aqueous polyvinyl alcohol solution, the resulting dope then being extruded into a coagulation bath.

BACKGROUND OF THE INVENTION

It is known that polyvinyl alcohol fiber has excellent strength, elongation and chemical stability; however, it has rather poor dyeability. Therefore polyvinyl alcohol fiber is suitable for industrial purposes but inappropriate for textiles to be used in clothes. A number of studies have been made, all without satisfactory results, to improve dyeability. When various natural or synthetic polymer materials are blended with a polyvinyl alcohol solution, it is difficult to improve both dyeability and physical properties; that is, if dyeability is improved, physical properties are generally decreased and vice versa.

SUMMARY OF THE INVENTION

It has now been found that shaped articles, such as fibers or film, when prepared from a blend of denatured collagen and polyvinyl alcohol combine the desired mechanical properties of polyvinyl alcohol with better dyeability and other desirable properties.

In this invention, the term "denatured collagen" includes: (1) soluble collagen; (2) solubilized collagen obtained by treating insoluble collagen with enzyme; enzyme and acid, or enzyme and divalent metal salt to disperse collagen in water in the monomolecular state without decomposition; (3) gelatin obtained by heating collagen fiber produced from solubilized collagen in hot water, said gelatin having uniform distribution of molecular weight; (4) commercially available gelatin; and (5) glue. The use of the commercially available gelatin and glue results in finished products that are somewhat inferior because discolouration and odor. Therefore, the denatured collagen as described under (1), (2) and (3) is most suitable.

The polyvinyl alcohol fiber produced according to this invention has excellent dyeability, especially for acid, Sirius direct and reactive dyestuff, and the dyed fiber has good light fastness. The dyeability is similar to that of silk, wool, cotton and nylon.

Formalization of polyvinyl alcohol fiber has been proposed heretofore. The formalized fiber has relatively good dyeability but low tensile recovery on elongation. Therefore, formalized fiber is not suitable for clothes. In place of formaldehyde, benzaldehyde is employed. The resulting benzalized fiber has an excellent tensile recovery on elongation, but unfortunately its dyeability is poor. However, fiber benzalized according to the present invention, possesses improved tensile recovery on elongation and also excellent dyeability, it is superior to formalized fiber. This is an important advantage of this invention.

A second advantage is the increased resistance of the modified fiber to hot water. Even though the polyvinyl alcohol empolyed has a low degree of polymerization and a low degree of saponification, the resistance to hot water of the fiber treated according to this invention is improved. This suggests that, if polyvinyl alcohol having a high degree of polymerization and a high degree of saponification is employed, more moderate after treatment conditions should be adopted. Formalization is done at 60°–70° C. for 30–60 minutes in the prior art but in this invention formalization carried out at 60° C. for only 3–5 minutes is sufficient to improve resistance to hot water. Tests show that, after boiling in water for one hour, there is less than about 6% shrinkage. This suggests the possibility of a short time formalization in continuous system in place of the batch system formalization heretofore carried out or, in place of shortening the treating time it is possible to lower the treating temperature; for example, 30° C. for 30 to 60 minutes has proven adequate. The shortening of time or lowering of treating temperature improves the efficiency of commercial operations for producing polyvinyl alcohol fiber.

The fiber according to this invention has excellent physical and chemical stability. For instance, when the benzalized fiber is treated in a Soxhlet extractor with boiling water for 10 hours or more, the fibrous structure does not change, whereas fiber produced from polyvinyl alcohol alone, when treated under the same conditions, changes to a rubber-like mass or dissolves. From this fact, it is believed that a certain chemical and physical linkage takes place between polyvinyl alcohol and denatured collagen to stabilize the fiber structure.

When the fiber of this invention is produced by wet spinning, a fiber having high circularity coefficient and uniform lateral order structure can be obtained by appropriately defining the spinning conditions. In general, the fiber produced from polyvinyl alcohol alone has a so-called dog bone type cross-section and a two-layer structure with distinct skin and core layers, a structure that has poor dyeability and poor texture. Previous attempts to eliminate these defects were commercially unsuccessful because a complicated process is required and there are defects inherent in the process. When denatured collagen is blended with polyvinyl alcohol the lateral order of the resulting fiber is improved to some extent. Greater improvement is obtained by decreasing the salt concentration of the coagulation bath. A pure polyvinyl alcohol fiber which is spun employing a conventional coagulation bath contains 33% by weight of sodium sulfate and has a circularity coefficient in general, of about 40% to 50%. The fiber according to this invention has a circularity coefficient of as much as 80% to 90% when the dope is spun into a coagulation bath containing, for example, 23% by weight of sodium sulfate.

In general, it is difficult to obtain a uniform mixed solution of two or more polymers, since phase separation frequently occurs. Therefore, this invention uses an aqueous solution of polyvinyl alcohol and denatured collagen with a pH of 2.0 to 4.5. Above pH 4.5, there is phase separation. If the pH is less than 2.0, undesired hydrolysis of denatured collagen occurs and there is no advantage in blending in the denatured collagen. Furthermore, according to this invention a low temperature (40° to 50° C.) of the spinning solution is sufficient commercial for wet spinning. This is of significant commercial benefit, since the temperature of a conventional spinning solution of polyvinyl alcohol is about 80° to 90° C. We do not want to be bound by the theory, but it is believed that polyvinyl alcohol and denatured collagen form a stable complex in the solution at the above-mentioned pH range.

The fiber or film produced from this aqueous solution by the above-mentioned procedure is transparent and the two components are uniformly distributed throughout the product. This fact shows that polyvinyl alcohol and denatured collagen are mixed completely with each other in aqueous solution and also in the solid state. The spinning dope of the invention can be spun by wet or dry spinning processes without any trouble.

In general, synthetic fibers have a hygroscopicity lower than that of cotton. It has been found that the fiber according to this invention has a moisture content of about 10% when stored at 30° C. and 65% R.H. which is higher than that of cotton which is about 8%. This high hygroscopicity is an advantageous feature of this invention.

The proportion of polyvinyl alcohol and denatured collagen is an important factor. It has been found that a ratio of denatured collagen to polyvinyl alcohol of 5–30% collagen to 95–70% polyvinyl alcohol by weight is most suitable. A substantial improvement of dyeability is observed, when more than about 10% by weight of denatured collagen is present. If the denatured collagen content is less than 5% by weight, it does not improve the properties of the fiber. If the collagen content is more than 30%, spinning becomes more difficult, and, especially during heat drawing and heat setting, fibers tend to stick together and, further, the resulting fiber is inferior.

Denatured collagen is dissolved for example in aqueous hydrochloric acid, acetic acid or citric acid solution of pH 2.–4.5 at about 40° C. in the desired concentration, for example about 15% by weight. Polyvinyl alcohol is dissolved in water at 90° C.–100° C., and the solution is adjusted to a pH of 2.0–4.5, a temperature at 60°–80° C. and a concentration of 15% by weight. The two solutions are admixed to form a spinning dope in which the ratio of denatured collagen to polyvinyl alcohol is 5–30 to 95–70 by weight. Care should be taken to obtain a uniform mixture. The spinning dope can be stored at 40° to 50° C. Then the dope is filtered, defoamed, and extruded through a suitable nozzle into a coagulation bath or hot air to form fiber or another desired shape, for example, film. If desired, the product so obtained can be subjected to cold and hot drawing, heat setting and acetalization treatment as in a conventional process. In the production of fiber, the first bath (coagulation bath) and second bath (drawing bath) are aqueous solutions of sodium sulfate, the concentration of the baths being 20–25% and 33% by weight, respectively; the resulting fiber has a high circularity coefficient, round cross-section and uniform lateral order. In the case of high denatured collagen content in the spinning dope, a divalent metal salt such as magnesium sulfate, zinc sulfate, magnesium chloride and zinc chloride, which is inert to the components of the coagulation bath and does not affect the properties of the fiber in heat setting, may be added to the coagulation bath for more complete coagulation.

PREFERRED EMBODIMENTS OF THE INVENTION

Example 1

Polyvinyl alcohol having an average degree of polymerization of 1650 and a residual acetic group of 0.064 molar percent and denatured collagen having an average molecular weight of about 120,000 were employed, in this example, respectively. The solid content of the dope was 15%, by weight, in which the ratio of polyvinyl alcohol to denatured collagen was 90 to 10 and the pH of the dope was 2.6. This dope was extruded through a spinneret having 100 holes, each 0.11 mm. in diameter, into a 33% aqueous sodium sulfate solution ($d=1.32$), at 40° C. The pH value of the coagulation bath was 11.9 and the spinning rate was 3.3 g./min. (3.46 m./min.). The fibers formed were wound up at a drawing ratio of 1.44. Then the fibers were treated in a wet drawing bath, which had the same composition and temperature as the coagulation bath, but was neutral, at a drawing ratio of 4.0. Then the fibers were subjected to dry hot drawing at a ratio of 1.25 at a temperature of 180° C. Thus, the total drawing ratio was 5.0. Thereafter, the fibers were heat treated in hot air at 230° C. for 90 seconds and formalized in a formalizing bath containing 300 g./l. of $Na_2SO_4$, 250 g./l. of $H_2SO_4$ and 60 g./l. of $H \cdot CHO$ at 70° C. for 40 minutes. The fibers thus obtained were as resistant to hot water as those produced from polyvinyl alcohol alone, and, in addition, had excellent dyeability. The results are given in Table 1.

Example 2

The procedures of Example 1 were repeated except that the formalization conditions were modified to 30° C. for 1 hour. The fiber so produced had better dyeability and higher hygroscopicity than that of Example 1. In contrast, when these modified formalization conditions were employed for pure polyvinyl alcohol fiber, the fiber became swollen or dissolved in hot water. The results are given in Table 1.

Example 3

The procedures of Example 1 were repeated but benzalization was carried out at 60° C. for 60 minutes substituting the following bath for the formalization bath:

| | G./l. |
|---|---|
| Benzaldehyde | 6.5 |
| $H_2SO_4$ | 20 |
| Anionic surfactant | 0.5 |

The fiber had high tensile recovery on elongation and excellent dyeability as shown in Table 1.

Example 4

The same procedures as in Example 1 were followed but 85 parts of polyvinyl alcohol and 15 parts of denatured collagen were employed in preparing the spinning dope, and the pH values of the spinning dope and the coagulation bath were 3.6 and 4.0, respectively.

Improved dyeability and hygroscopicity in the fiber were obtained as shown in Table 1.

Example 5

The procedures in Example 4 were repeated except that modified formalization conditions (at 30° C. for 1 hour) were employed. The hygroscopicity was further improved, becoming as high as 9.3%, as shown in Table 1.

Example 6

The procedures in Example 4 were repeated but in place of the formalization, the benzalization conditions described in Example 3 were employed.

Example 7

80 parts of polyvinyl alcohol and 20 parts of denatured collagen were employed and the procedures of Example 4 were followed to produce the fiber.

Example 8

The procedures in Example 7 were repeated but formalization was carried out under moderate conditions (at 30° C. for 3 hours). Hygroscopicity of the fiber was improved significantly, that is, it became 11% which is higher than cotton.

Example 9

The procedures of Example 7 were repeated except that that benzalization conditions of Example 3 were substituted for the formalization to produce the fiber.

Example 10

In this example, a gelatin commercially available for photographic purpose, having an average molecular weight of about 10,000 was used.

85 parts of polyvinyl alcohol and 15 parts of gelatin were processed according to the procedures in Example 5.

Resistance to hot water was inferior to the fiber produced by employing denatured collagen, but other properties were similar.

Example 11

The procedures in Example 10 were repeated, but formalization was carried out under the moderate conditions disclosed in Example 2.

Results similar to those obtained in Example 10 were obtained, as shown in Table 1.

Example 12

15 parts of gelatin and 85 parts of polyvinyl alcohol were employed and the procedures in Example 6 were followed.

Examples 13–15

15 parts of a commercially available acid processed gelatin (Isoelectric point=9.1) and 85 parts of polyvinyl alcohol were employed to form the spinning dope. Then the same procedures as in Example 10 (Example 13), Example 11, (Example 14) and Example 12 (Example 15) were repeated, respectively.

Example 16

The procedures in Example 1 were repeated except that the coagulation bath was a 23% aqueous sodium sulfate solution. The fiber so produced was examined by microscope. The cross-section was substantially round in form and had no two-layer structure of skin and core layers; thus it indicated uniform lateral order.

Example 17

Instead of the denatured collagen used in Example 4, a commercially available glue was employed and other procedures were as in that example.

Although the dyeability and other properties of the resulting fiber were similar to the properties of fibers prepared in other examples, it seemed to be unsuitable for general textile use, since, it was slightly yellowish and had a faint odor of glue. See Table 1.

Example 18

In place of the formalization step in Example 17 the benzalization step of Example 2 was employed; other procedures were the same as in Example 17.

Example 19

80 parts of polyvinyl alcohol and 20 parts of the glue were employed and spinning, drawing and heat treating conditions were as in Example 16. Then, a modified formalization was carried out at 30° C. for 1 hour. The properties of the fibers produced in the above examples are given in Table 1.

TABLE 1

| | Components in dope, by weight | | | | | | | | | | | |
|---|---|---|---|---|---|---|---|---|---|---|---|---|
| | PVA, 100 | | | PVA:C, 90:10 | | | PVA:C, 85:15 | | | PVA:C, 80:20 | | |
| | Example number | | | | | | | | | | | |
| | 1 | 2 | 3 | 4 | 5 | 6 | 7 | 8 | 9 | | | |
| | After treatment | | | | | | | | | | | |
| | F | F' | B | F | F' | B | F | F' | B | F | F' | B |
| Strength, g./d | 4.0 | 3.5 | 3.7 | 3.0 | 3.0 | 3.2 | 3.1 | 3.3 | 3.3 | 3.2 | 3.5 | 3.2 |
| Elongation, percent | 25.1 | 24.5 | 29.4 | 23.1 | 23.0 | 29.0 | 25.3 | 23.0 | 29.9 | 24.0 | 24.3 | 29.0 |
| 3% modulus, percent | 71.0 | 76.0 | 81.0 | 76.0 | 75.0 | 83.0 | 76.0 | 78.0 | 86.0 | 73.0 | 76.0 | 85.0 |
| Shrinkage after boiling in water for 1 hour, percent | 2.4 | 64.0 | 16.3 | 2.8 | 6.3 | 1.8 | 2.1 | 3.5 | 1.6 | 4.5 | 5.0 | 1.5 |
| Moisture content at 65% R.H., percent | 5.1 | 5.9 | 4.6 | 5.4 | 7.9 | 4.8 | 5.9 | 9.3 | 6.0 | 6.7 | 11.0 | 7.5 |
| Dyeability percent: | | | | | | | | | | | | |
| Congo red | 21.2 | 25.5 | 18.3 | 7.36 | 85.6 | 64.0 | 75.5 | 82.0 | 80.0 | 78.2 | 80.5 | 87.0 |
| Mistui brilliant milling red BL | 4.7 | 6.5 | 3.1 | 90.4 | 75.9 | 42.3 | 96.2 | 98.0 | 97.0 | 96.7 | 98.0 | 98.2 |

| | Components in dope, by weight | | | | | | | | | |
|---|---|---|---|---|---|---|---|---|---|---|
| | PVA:G, 85:15 | | | PVA:AG, 85:15 | | | PVA:C, 90:10 | PVA:glue, 85:15 | | PVA:glue, 80:20 |
| | Example number | | | | | | | | | |
| | 10 | 11 | 12 | 13 | 14 | 15 | 16 | 17 | 18 | 19 |
| | After treatment | | | | | | | | | |
| | F | F' | B | F | F' | B | F | F | B | F' |
| Strength, g./d | 3.3 | 3.1 | 3.5 | 3.1 | 3.0 | 3.2 | 3.0 | 3.2 | 2.9 | 3.5 |
| Elongation, percent | 23.2 | 24.5 | 28.9 | 23.0 | 24.5 | 27.0 | 27.3 | 26.3 | 31.0 | 25.0 |
| 3% modulus, percent | 74.0 | 76.0 | 85.0 | 74.0 | 75.0 | 88.5 | 75.0 | 74.0 | 86.2 | 76.0 |
| Shrinkage after boiling in water for 1 hour, percent | 3.5 | 12.9 | 15.7 | 2.5 | 9.5 | 12.0 | 2.7 | 3.2 | 6.8 | 5.5 |
| Moisture content at 65% R.H., percent | 6.3 | 8.5 | 5.7 | 6.5 | 8.5 | 6.0 | 6.7 | 6.3 | 5.9 | 11.5 |
| Dyeability, percent: | | | | | | | | | | |
| Congo red | 67.8 | 85.0 | 73.8 | 68.0 | 86.0 | 75.0 | | 76.0 | 78.0 | 98.0 |
| Mitsui brilliant milling red BL | 95.0 | 98.8 | 96.2 | 96.5 | 98.0 | 96.0 | | 83.0 | 80.0 | 82.0 |

NOTE.—PVA=polyvinyl alcohol; C=denatured collagen; G=gelatin; AG=acid processed gelatin; F=formalization; F'=modified formalization; B=benzalization.

We claim:
1. A process of making a shaped article which comprises:
   (a) mixing a water-soluble material selected from the group consisting of collagen and gelatin with polyvinyl alcohol in aqeuous solution to form a dope,
      (1) the weight ratio of said material to said polyvinyl alcohol in said dope being between 5:95 and 30:70, and
      (2) the pH of said dope being between 2.0 and 4.5; and
   (b) extruding said dope into an aqueous solution of a salt,
      (1) the concentration of said salt being sufficient to coagulate said extruded dope.

2. A process as set forth in claim 1, wherein said dope is extruded into said solution from a spinneret, whereby the extruded and coagulated dope forms fibers, and the process further comprises contacting said fibers with an aqueous formaldehyde solution at 60° to 70° C. for three to fifty minutes.

3. A process as set forth in claim 1, wherein said dope is extruded into said solution from a spinneret, whereby the extruded and coagulated dope forms fibers, and the process further comprises contacting said fibers with formaldehyde at approximately 30° C. for thirty to sixty minutes.

4. A process as set forth in claim 1, wherein said salt is aqueous sodium sulfate, and the concentration of said sodium sulfate in said solution thereof is between 20 and 25 percent.

References Cited

UNITED STATES PATENTS

| | | | |
|---|---|---|---|
| 2,239,718 | 4/1941 | Izard | 264—185X |
| 3,034,852 | 5/1962 | Nishihara | 264—203 |
| 3,066,107 | 11/1962 | Fukushima et al. | 260—8X |
| 3,104,154 | 9/1963 | Morimoto et al. | 264—202X |
| 3,200,178 | 8/1965 | Matsubagashi et al. | 264—185X |
| 3,425,968 | 2/1968 | Reiling | 260—8 |

FOREIGN PATENTS

| | | | |
|---|---|---|---|
| 45,580 | 5/1962 | Poland | 264—185 |

JAY H. WOO, Primary Examiner

U.S. Cl. X.R.

260—8; 264—202